United States Patent
Chen

(10) Patent No.: US 9,281,980 B2
(45) Date of Patent: Mar. 8, 2016

(54) RECEIVING APPARATUS AND METHOD, SENDING APPARATUS AND METHOD, FRONT-END CIRCUIT, MODULATOR, AND TRANSCEIVING SYSTEM

(71) Applicant: Huawei Technologies Co., Ltd., Shenzhen (CN)

(72) Inventor: Weijian Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/558,115

(22) Filed: Dec. 2, 2014

(65) Prior Publication Data

US 2015/0155948 A1 Jun. 4, 2015

(30) Foreign Application Priority Data

Dec. 2, 2013 (CN) .......................... 2013 1 0637614

(51) Int. Cl.
*H04B 10/00* (2013.01)
*H04L 27/26* (2006.01)
*H04B 10/516* (2013.01)
*H04B 10/548* (2013.01)
*H04B 10/67* (2013.01)
*H04B 10/69* (2013.01)
*H04J 14/00* (2006.01)

(52) U.S. Cl.
CPC ........ *H04L 27/2601* (2013.01); *H04B 10/5165* (2013.01); *H04B 10/548* (2013.01); *H04B 10/675* (2013.01); *H04B 10/69* (2013.01)

(58) Field of Classification Search
CPC .................................................. H04B 10/5165
See application file for complete search history.

(56) References Cited

U.S. PATENT DOCUMENTS

| 2012/0087668 A1* | 4/2012 | Li | H04L 27/2628 398/79 |
| 2014/0363159 A1* | 12/2014 | Chien | H04B 10/506 398/43 |

FOREIGN PATENT DOCUMENTS

| CN | 101557271 A | 10/2009 |
| CN | 101848036 A | 9/2010 |
| CN | 102340477 A | 2/2012 |

* cited by examiner

*Primary Examiner* — Daniel Dobson
(74) *Attorney, Agent, or Firm* — Leydig, Voit & Mayer, Ltd.

(57) ABSTRACT

A receiving apparatus and method, a sending apparatus and method, a front-end circuit, a modulator, and a transceiving system are provided. The sending apparatus includes: a double-sideband OFDM modulator, configured to perform double-sideband OFDM modulation on a bit sequence of service data to obtain a double-sideband OFDM analog electrical signal, where the double-sideband OFDM analog electrical signal carries the service data on both positive and negative sidebands, and an IQMZ, configured to perform optical carrier modulation on the double-sideband OFDM analog electrical signal to obtain a double-sideband OFDM optical signal, where the double-sideband OFDM optical signal carries the service data on both positive and negative sidebands. In comparison with a traditional manner in which service data is only carried on a positive sideband, bandwidth utilization in the present invention doubles.

12 Claims, 6 Drawing Sheets

RECEIVING APPARATUS AND METHOD, SENDING APPARATUS AND METHOD, FRONT-END CIRCUIT, MODULATOR, AND TRANSCEIVING SYSTEM

CROSS-REFERENCE TO RELATED APPLICATION

This application claims priority to Chinese Patent Application No. 201310637614.6, filed on Dec. 2, 2013, which is hereby incorporated by reference in its entirety.

TECHNICAL FIELD

The present invention relates to the field of communications technologies, and more particularly, to a receiving apparatus and method, a sending apparatus and method, a front-end circuit, a modulator, and a transceiving system.

BACKGROUND

An Orthogonal Frequency Division Multiplexing (OFDM) technology can dynamically allocate a bit sequence of high-speed serial service data to subcarriers whose spectrums are mutually overlapping and orthogonal, and is extensively studied and applied increasingly in the field of optical communications.

In the field of optical communications, a traditional practice is that, after an OFDM analog electrical signal is generated, the OFDM analog electrical signal is modulated by using in phase quadrature phase-shift keying Mach Zehnder (IQMZ) modulator to obtain a signal sideband OFDM optical signal. When the OFDM analog electrical signal is generated, from the perspective of the frequency domain, service data is only filled in a positive sideband, and no service data is filled in a negative sideband: That the length of FFT/IFFT is 1024 is used as an example. 1024 subcarriers can be filled in the entire frequency band, where the first to the $512^{th}$ subcarriers belong to a positive sideband, and the $513^{th}$ to the $1024^{th}$ subcarriers belong to a negative sideband. Service data is only filled in the second to the $512^{th}$ subcarriers, a direct current component is filled (for example, 0 is filled) in the first subcarrier, and 0 is filled in the $513^{th}$ to the $1024^{th}$ subcarriers.

Because service data is only filled in the positive sideband, and no service data is filled in the negative sideband, the negative sideband is not utilized, and bandwidth utilization needs to be improved.

SUMMARY

In view of the above, an objective of embodiments of the present invention is to provide a receiving apparatus and method, a sending apparatus and method, a front-end circuit, a modulator, and a transceiving system, so as to increase bandwidth utilization.

To achieve the foregoing objective, the embodiments of the present invention provide the following technical solutions:

According to a first aspect of an embodiment of the present invention, a sending apparatus is provided, including: a double-sideband orthogonal frequency division multiplexing OFDM modulator, configured to perform double-sideband OFDM modulation on a bit sequence of service data to obtain a double-sideband OFDM analog electrical signal, where the double-sideband OFDM analog electrical signal carries the service data on both positive and negative sidebands, the positive sideband includes the first to the $N^{th}$ subcarriers, the negative sideband includes the $(N+1)^{th}$ to the $2N^{th}$ subcarriers, and N is an integer greater than 1; and an IQMZ modulator, configured to perform optical carrier modulation on the double-sideband OFDM analog electrical signal output by the double-sideband OFDM modulator, to obtain a double-sideband OFDM optical signal, where the double-sideband OFDM optical signal carries the service data on both positive and negative sidebands.

With reference to the first aspect, in a first possible implementation manner, the double-sideband OFDM modulator includes: a serial-to-parallel converter, configured to perform serial-to-parallel conversion on the bit sequence of the service data; a mapper, configured to: perform, according to a modulation scheme used by each subcarrier, m quadrature amplitude modulation mapping on the bit sequence of the service data, where the serial-to-parallel converter has performed serial-to-parallel conversion on the bit sequence; and successively fill the mapped service data in the second to the $2N^{th}$ subcarriers to obtain a modulated information sequence; an inverse fast Fourier transform IFFT device, configured to perform IFFT on the modulated information sequence generated by the mapper; a parallel-to-serial converter, configured to perform parallel-to-serial conversion on the modulated information sequence processed by the IFFT device, to obtain a double-sideband OFDM digital electrical signal; and a digital-to-analog converter, configured to perform digital-to-analog conversion on the double-sideband OFDM digital electrical signal generated by the parallel-to-serial converter, to obtain the double-sideband OFDM analog electrical signal.

According to a second aspect of an embodiment of the present invention, a modulator is provided, including: a serial-to-parallel converter, configured to perform serial-to-parallel conversion on a bit sequence of service data; a mapper, configured to: perform, according to a modulation scheme used by each subcarrier, m quadrature amplitude modulation mapping on the bit sequence of the service data, where the serial-to-parallel converter has performed serial-to-parallel conversion on the bit sequence; and successively fill the mapped service data in the second to the $2N^{th}$ subcarriers to obtain a modulated information sequence; an inverse fast Fourier transform IFFT device, configured to perform IFFT on the modulated information sequence generated by the mapper; a parallel-to-serial converter, configured to perform parallel-to-serial conversion on the modulated information sequence processed by the IFFT device, to obtain a double-sideband orthogonal frequency division multiplexing OFDM digital electrical signal; and a digital-to-analog converter, configured to perform digital-to-analog conversion on the double-sideband OFDM digital electrical signal generated by the parallel-to-serial converter, to obtain a double-sideband OFDM analog electrical signal, where the double-sideband OFDM analog electrical signal carries the service data on both positive and negative sidebands, the positive sideband includes the first to the $N^{th}$ subcarriers, the negative sideband includes the $(N+1)^{th}$ to the $2N^{th}$ subcarriers, and N is an integer greater than 1.

According to a third aspect of an embodiment of the present invention, a receiving apparatus is provided, including: an optical coupler, a positive sideband optical filter, a negative sideband optical filter, a first receiver, a second receiver, and an orthogonal frequency division multiplexing OFDM demodulator, where: the optical coupler is separately connected to the positive sideband optical filter and the negative sideband optical filter; the positive sideband optical filter is further connected to the first receiver; the negative sideband optical filter is further connected to the second receiver; the first receiver is further connected to the OFDM demodulator;

and the second receiver is further connected to the OFDM demodulator, where: the optical coupler is configured to: divide a received double-sideband OFDM optical signal into two signals, and respectively output the two signals to the positive sideband optical filter and the negative sideband optical filter, where the double-sideband OFDM optical signal carries service data on both positive and negative sidebands, the positive sideband includes the first to the $N^{th}$ subcarriers, the negative sideband includes the $(N+1)^{th}$ to the $2N^{th}$ subcarriers, and N is an integer greater than 1; the positive sideband optical filter is configured to filter out a positive sideband OFDM optical signal from the received double-sideband OFDM optical signal; the negative sideband optical filter is configured to filter out a negative sideband OFDM optical signal from the received double-sideband OFDM optical signal; the first receiver is configured to perform optical-to-electrical conversion on the positive sideband OFDM optical signal to obtain a positive sideband OFDM analog electrical signal; the second receiver is configured to perform optical-to-electrical conversion on the negative sideband OFDM optical signal to obtain a negative sideband OFDM analog electrical signal; and the OFDM demodulator is configured to perform OFDM demodulation on the positive sideband OFDM analog electrical signal and the negative sideband OFDM analog electrical signal.

With reference to the third aspect, in a first possible implementation manner, the OFDM demodulator includes: an analog-to-digital converter, configured to: perform analog-to-digital conversion on the positive sideband OFDM analog electrical signal to obtain a positive sideband OFDM digital signal, and perform analog-to-digital conversion on the negative sideband OFDM analog electrical signal to obtain a negative sideband OFDM digital signal; a serial-to-parallel converter, configured to: combine the positive sideband OFDM digital signal and the negative sideband OFDM digital signal into one signal and perform serial-to-parallel conversion on the signal to obtain a double-sideband modulated information sequence; or separately perform serial-to-parallel conversion on the positive sideband OFDM digital signal and the negative sideband OFDM digital signal to obtain a positive sideband modulated information sequence and a negative sideband modulated information sequence; a Fourier transform FFT device, configured to perform FFT on the double-sideband modulated information sequence to obtain a frequency domain double-sideband modulated information sequence, or separately perform FFT on the positive sideband modulated information sequence and the negative sideband modulated information sequence to obtain a frequency domain positive sideband modulated information sequence and a frequency domain negative sideband modulated information sequence; a de-mapper, configured to: perform m quadrature amplitude modulation de-mapping on the frequency domain double-sideband modulated information sequence, and successively output a de-mapped bit sequence of the service data; or configured to: perform m quadrature amplitude modulation de-mapping on the frequency domain positive sideband modulated information sequence, and successively output a de-mapped first bit sequence, of the service data, that is distributed on the second to the $N^{th}$ subcarriers; and perform m quadrature amplitude modulation de-mapping on the frequency domain negative sideband modulated information sequence, and successively output a de-mapped second bit sequence, of the service data, that is distributed on the $(N+1)^{th}$ to the $2N^{th}$ subcarriers; and a parallel-to-serial converter, configured to: perform parallel-to-serial conversion on the bit sequence, which is output by the de-mapper, of the service data, or separately perform parallel-to-serial conversion on the first bit sequence and the second bit sequence.

According to a fourth aspect of an embodiment of the present invention, a front-end circuit is provided, including: an optical coupler, a positive sideband optical filter, a negative sideband optical filter, a first receiver, and a second receiver, where: the optical coupler is separately connected to the positive sideband optical filter and the negative sideband optical filter; the positive sideband optical filter is further connected to the first receiver; the negative sideband optical filter is further connected to the second receiver; the first receiver is further connected to an OFDM demodulator; and the second receiver is further connected to the OFDM demodulator, where: the optical coupler is configured to: divide a received optical signal into two signals, and respectively output the two signals to the positive sideband optical filter and the negative sideband optical filter, where the received optical signal is a double-sideband OFDM optical signal, and the double-sideband OFDM optical signal carries service data on both positive and negative sidebands; the positive sideband optical filter is configured to filter out a positive sideband OFDM optical signal from the received double-sideband OFDM optical signal; the negative sideband optical filter is configured to filter out a negative sideband OFDM optical signal from the received double-sideband OFDM optical signal; the first receiver is configured to perform optical-to-electrical conversion on the positive sideband OFDM optical signal to obtain a positive sideband OFDM analog electrical signal; and the second receiver is configured to perform optical-to-electrical conversion on the negative sideband OFDM optical signal to obtain a negative sideband OFDM analog electrical signal.

According to a fifth aspect of an embodiment of the present invention, a sending method is provided, including: performing double-sideband orthogonal frequency division multiplexing OFDM modulation on a bit sequence of service data to obtain a double-sideband OFDM analog electrical signal, where the double-sideband OFDM analog electrical signal carries the service data on both positive and negative sidebands, the positive sideband includes the first to the $N^{th}$ subcarriers, the negative sideband includes the $(N+1)^{th}$ to the $2N^{th}$ subcarriers, and N is an integer greater than 1; and performing optical carrier modulation on the double-sideband OFDM analog electrical signal to obtain a double-sideband OFDM optical signal, where the double-sideband OFDM optical signal carries the service data on both positive and negative sidebands.

With reference to the fifth aspect, in a first possible implementation manner, the performing double-sideband OFDM modulation includes: performing serial-to-parallel conversion on the bit sequence of the service data; performing, according to a modulation scheme used by each subcarrier, m quadrature amplitude modulation mapping on the bit sequence of the service data, where serial-to-parallel conversion has been performed on the bit sequence, and successively filling the mapped service data in the second to the $2N^{th}$ subcarriers to obtain a modulated information sequence; performing inverse fast Fourier transform IFFT on the modulated information sequence; performing parallel-to-serial conversion on the modulated information sequence processed by IFFT, to obtain a double-sideband OFDM digital electrical signal; and performing digital-to-analog conversion on the double-sideband OFDM digital electrical signal to obtain the double-sideband OFDM analog electrical signal.

According to a sixth aspect of an embodiment of the present invention, a receiving method is provided, including: filtering out a positive sideband OFDM optical signal and a negative sideband OFDM optical signal from a received double-sideband orthogonal frequency division multiplexing OFDM optical signal, where the double-sideband OFDM optical signal carries service data on both positive and negative sidebands, the positive sideband includes the first to the $N^{th}$ subcarriers, the negative sideband includes the $(N+1)^{th}$ to the $2N^{th}$ subcarriers, and N is an integer greater than 1; performing optical-to-electrical conversion on the positive sideband OFDM optical signal to obtain a positive sideband OFDM analog electrical signal; performing conversion on the negative sideband OFDM optical signal to obtain a negative sideband OFDM analog electrical signal; and performing OFDM demodulation on the positive sideband OFDM analog electrical signal and the negative sideband OFDM analog electrical signal.

With reference to the sixth aspect, in a first possible implementation manner, the performing demodulation on the positive sideband OFDM electrical signal and the negative sideband OFDM electrical signal includes: combining the positive sideband OFDM analog electrical signal and the negative sideband analog OFDM electrical signal into one signal, and performing OFDM demodulation on the signal; or separately performing OFDM demodulation on the positive sideband OFDM analog electrical signal and the negative sideband OFDM analog electrical signal.

With reference to the first possible implementation manner of the sixth aspect, in a second possible implementation manner, the combining the positive sideband OFDM analog electrical signal and the negative sideband analog OFDM electrical signal into one signal, and performing OFDM demodulation on the signal includes: separately performing analog-to-digital conversion on the positive sideband OFDM analog electrical signal and the negative sideband OFDM analog electrical signal to obtain a positive sideband OFDM digital signal and a negative sideband OFDM digital signal; combining the positive sideband OFDM digital signal and the negative sideband OFDM digital signal into one signal, and performing serial-to-parallel conversion on the signal to obtain a double-sideband modulated information sequence; performing FFT on the double-sideband modulated information sequence to obtain a frequency domain double-sideband modulated information sequence; performing m quadrature amplitude modulation de-mapping on the frequency domain double-sideband modulated information sequence, and successively outputting a de-mapped bit sequence of the service data; and performing parallel-to-serial conversion on the de-mapped bit sequence of the service data.

With reference to the first possible implementation manner of the sixth aspect, in a third possible implementation manner, the separately performing OFDM demodulation on the positive sideband OFDM analog electrical signal and the negative sideband OFDM analog electrical signal includes: separately performing analog-to-digital conversion on the positive sideband OFDM analog electrical signal and the negative sideband OFDM analog electrical signal to obtain a positive sideband OFDM digital signal and a negative sideband OFDM digital signal; separately performing serial-to-parallel conversion on the positive sideband OFDM digital signal and the negative sideband OFDM digital signal to obtain a positive sideband modulated information sequence and a negative sideband modulated information sequence; separately performing Fourier transform on the positive sideband modulated information sequence and the negative sideband modulated information sequence to obtain a frequency domain positive sideband modulated information sequence and a frequency domain negative sideband modulated information sequence; performing m quadrature amplitude modulation de-mapping on the frequency domain positive sideband modulated information sequence, successively outputting a de-mapped first bit sequence, of the service data, that is distributed on the second to the $N^{th}$ subcarriers, and performing parallel-to-serial conversion on the de-mapped bit sequence; and performing m quadrature amplitude modulation de-mapping on the frequency domain negative sideband modulated information sequence, successively outputting a de-mapped second bit sequence, of the service data, that is distributed on the $(N+1)^{th}$ to the $2N^{th}$ subcarriers, and performing parallel-to-serial conversion on the de-mapped bit sequence.

According to a seventh aspect of an embodiment of the present invention, a sending apparatus and a receiving apparatus are provided, where: the sending apparatus includes: a double-sideband orthogonal frequency division multiplexing OFDM modulator, configured to perform double-sideband OFDM modulation on a bit sequence of service data to obtain a double-sideband OFDM analog electrical signal, where the double-sideband OFDM analog electrical signal carries the service data on both positive and negative sidebands, the positive sideband includes the first to the $N^{th}$ subcarriers, the negative sideband includes the $(N+1)^{th}$ to the $2N^{th}$ subcarriers, and N is an integer greater than 1; and an IQMZ modulator, configured to perform optical carrier modulation on the double-sideband OFDM analog electrical signal output by the double-sideband OFDM modulator, to obtain a double-sideband OFDM optical signal, where the double-sideband OFDM optical signal carries the service data on both positive and negative sidebands; and the receiving apparatus includes: an optical coupler, a positive sideband optical filter, a negative sideband optical filter, a first receiver, a second receiver, and an orthogonal frequency division multiplexing OFDM demodulator, where: the optical coupler is separately connected to the positive sideband optical filter and the negative sideband optical filter; the positive sideband optical filter is further connected to the first receiver; the negative sideband optical filter is further connected to the second receiver; the first receiver is further connected to the OFDM demodulator; and the second receiver is further connected to the OFDM demodulator, where: the optical coupler is configured to: divide a received double-sideband OFDM optical signal into two signals, and respectively output the two signals to the positive sideband optical filter and the negative sideband optical filter, where the double-sideband OFDM optical signal carries the service data on both positive and negative sidebands, the positive sideband includes the first to the $N^{th}$ subcarriers, the negative sideband includes the $(N+1)^{th}$ to the $2N^{th}$ subcarriers, and N is an integer greater than 1; the positive sideband optical filter is configured to filter out a positive sideband OFDM optical signal from the received double-sideband OFDM optical signal; the negative sideband optical filter is configured to filter out a negative sideband OFDM optical signal from the received double-sideband OFDM optical signal; the first receiver is configured to perform optical-to-electrical conversion on the positive sideband OFDM optical signal to obtain a positive sideband OFDM analog electrical signal; the second receiver is configured to perform optical-to-electrical conversion on the negative sideband OFDM optical signal to obtain a negative sideband OFDM analog electrical signal; and the OFDM demodulator is configured to perform OFDM demodulation on the positive sideband OFDM analog electrical signal and the negative sideband OFDM analog electrical signal.

It can be learned that, in embodiments of the present invention, an OFDM analog electrical signal carries service data on both positive and negative sidebands, and a double-sideband OFDM optical signal obtained by modulating the sideband OFDM analog electrical signal also carries the service data on both positive and negative sidebands. In comparison with a traditional manner in which service data is only carried on a positive sideband, bandwidth utilization in the present invention doubles.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
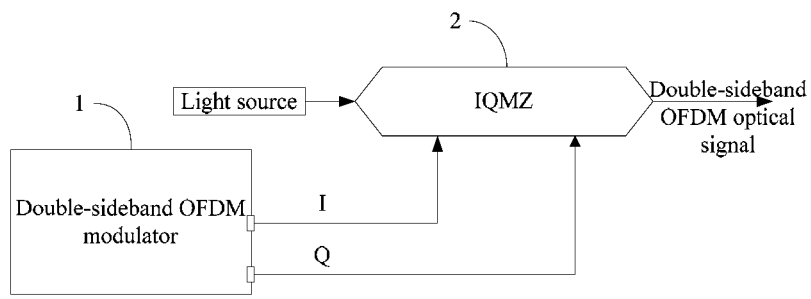
FIG. 1 is a schematic structural diagram of a sending apparatus according to an embodiment of the present invention.

Refer to FIG. 1, which is a structure of a sending apparatus provided in an embodiment of the present invention. The sending apparatus may include:

a double-sideband OFDM modulator 1, configured to perform double-sideband OFDM modulation on a bit sequence of service data to obtain a double-sideband OFDM analog electrical signal, where:

the double-sideband OFDM analog electrical signal carries the service data on both positive and negative sidebands, where: the positive sideband includes the first to the $N^{th}$ subcarriers, the negative sideband includes the $(N+1)^{th}$ to the $2N^{th}$ subcarriers, and N is an integer greater than 1; and an IQMZ modulator 2, configured to perform optical carrier modulation on the double-sideband OFDM analog electrical signal output by the double-sideband OFDM modulator 1, to obtain a double-sideband OFDM optical signal, where the double-sideband OFDM optical signal carries the service data on both positive and negative sidebands.

It can be learned that, in this embodiment of the present invention, the OFDM analog electrical signal carries the service data on both positive and negative sidebands, and the double-sideband OFDM optical signal obtained by modulating the OFDM analog electrical signal also carries the service data on both positive and negative sidebands. In comparison with a traditional manner in which service data is only carried on a positive sideband, bandwidth utilization in the present invention doubles.

Figure 2:
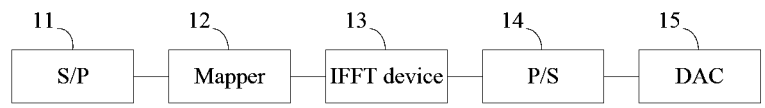
FIG. 2 is a schematic structural diagram of a double-sideband OFDM modulator according to an embodiment of the present invention.

Referring to FIG. 2, in another embodiment of the present invention, the double-sideband OFDM modulator 1 in the foregoing embodiment may further include:

a serial-to-parallel converter (S/P) 11, configured to perform serial-to-parallel conversion on the bit sequence of the service data to obtain a parallel bit sequence of the service data, where:

how serial-to-parallel conversion is performed is a prior art, and details are not described herein again;

a mapper 12, configured to: perform, according to a modulation scheme used by each subcarrier, m quadrature amplitude modulation mapping on the bit sequence of the service data (the parallel bit sequence of the service data), where the serial-to-parallel converter 11 has performed serial-to-parallel conversion on the bit sequence; and successively fill the mapped service data in the second to the $2N^{th}$ subcarriers to obtain a modulated information sequence;

an inverse fast Fourier transform (IFFT) device 13, configured to perform IFFT on the modulated information sequence generated by the mapper 12, where:

IFFT is a relatively mature prior art, and details are not described herein again; a parallel-to-serial converter (P/S) 14, configured to perform parallel-to-serial conversion on the modulated information sequence processed by the IFFT device 13, to obtain a double-sideband OFDM digital electrical signal, where:

how parallel-to-serial conversion is performed is a prior art, and details are not described herein again; and a digital-to-analog converter (DAC) 15, configured to perform digital-to-analog conversion on the double-sideband OFDM digital electrical signal generated by the parallel-to-serial converter 14, to obtain the double-sideband OFDM analog electrical signal, where:

how perform digital-to-analog conversion is performed is a prior art, and details are not described herein again.

A detailed introduction to working of the mapper 12 is provided.

Figure 3:
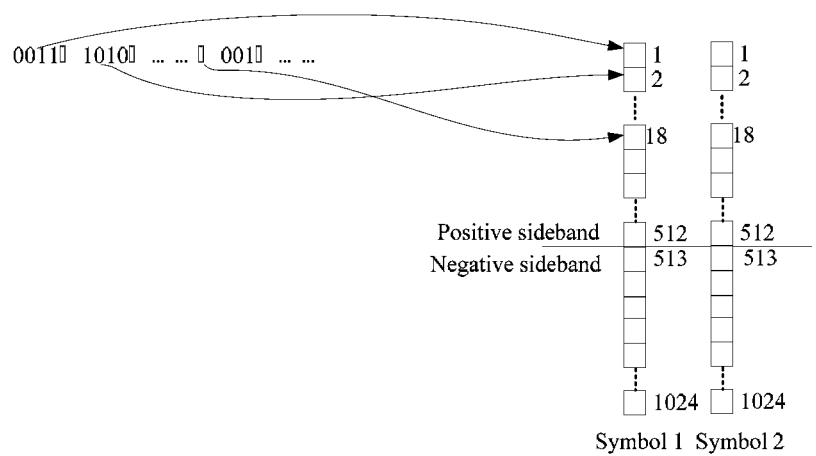
FIG. 3 is a schematic working diagram of a mapper according to an embodiment of the present invention.

Refer to FIG. 3. That the length of FFT/IFFT is 1024 is used as an example. In this case, 1024 subcarriers can be filled in the entire frequency band, where the first to the $512^{th}$ subcarriers belong to a positive sideband, and the $513^{th}$ to the $1024^{th}$ subcarriers are a negative sideband.

In a traditional manner of generating a single-sideband OFDM electrical signal, a mapper performs m quadrature amplitude modulation (m-QAM) mapping on a service data bit in a bit sequence of service data according to a result of a channel estimation, and successively fills the mapped service data in the second to the $512^{th}$ subcarriers (a direct current component is filled in the first subcarrier), and 0 is filled in other subcarriers, and after the entire frequency band is fully filled, it is referred to as one symbol, where:

m may be 2, 4, 8, 16, 32, 64, and the like, which are respectively corresponding to 1 bit, 2 bits, 3 bits, 4 bits, 5 bits, and 6 bits, and the like.

For example, if it is found according to a result of a channel estimation that the second to the $17^{th}$ subcarriers (that is, the first 16 available subcarriers) are suitable for 16-QAM mapping, the first 64 bits (16*4=64) in a bit sequence of service data are classified into 16 groups, where each group includes 4 bits, 16-QAM mapping is performed on each group of data, and then the mapped service data is successively filled in the second to the $17^{th}$ subcarriers.

Similarly, if it is found that the $18^{th}$ to the $25^{th}$ subcarriers are suitable for 8-QAM, starting from the $65^{th}$ bit in the bit sequence of the service data, every 3 bits form one group, 8-QAM mapping is performed on each group, and then the mapped service data is successively filled in the $18^{th}$ to the $25^{th}$ subcarriers. After filling for the $512^{th}$ subcarrier is completed, 0 is filled in the $513^{th}$ to the $1024^{th}$ subcarriers, and then filling for a next symbol is performed. When the filling for the next symbol is being performed, similar to filling for the first symbol, when the filling for the $512^{th}$ subcarrier is completed, 0 is filled in the $513^{th}$ to the $1024^{th}$ subcarriers, and so on.

In this embodiment, after m quadrature amplitude modulation mapping is performed on the service data bit according to a result of a channel estimation, the mapped service data is successively filled in the second to the $1024^{th}$ subcarriers. That is, when filling for the $512^{th}$ subcarrier is completed, filling for the $513^{th}$ to the 1024 subcarriers is further performed continuously.

Further, in another embodiment of the present invention, the service data filled in the second to the $512^{th}$ subcarriers and the service data filled in the $513^{th}$ to the $1024^{th}$ subcarriers in all the foregoing embodiments may belong to different services. For example, service data of service 1 may be filled in the second to the $512^{th}$ subcarriers, and service data of service 2 may be filled in the $513^{th}$ to the $1024^{th}$ subcarriers. In this way, one more service may be transmitted by using a negative sideband, thereby doubling a system service capacity.

Furthermore, an extension may be further made. The service data of service 1 is filled in the second to the $256^{th}$ subcarriers, the service data of service 2 is filled in the $257^{th}$ to the $512^{th}$ subcarriers, service data of service 3 is filled in the $513^{th}$ to the $1024^{th}$ subcarriers, and so on.

Certainly, service data filled in the second to the $512^{th}$ subcarriers and service data filled in the $513^{th}$ to the $1024^{th}$ subcarriers may also belong to a same service. In this case, a service that previously needs to occupy N symbols only needs to occupy N/2 symbols, thereby improving a transmission speed.

Figure 4:
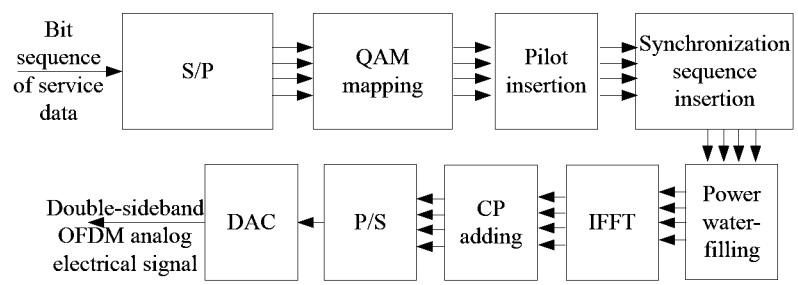
FIG. 4 is a flowchart of double-sideband OFDM modulation according to an embodiment of the present invention.

FIG. 4 shows a more detailed step performed by the double-sideband OFDM modulator 1, and the more detailed step may further include pilot insertion, synchronization sequence insertion, power water-filling, cyclic prefix (CP, Cyclic Prefix) adding, and the like.

From the perspective of device structure, the double-sideband OFDM modulator 1 may further include:

a pilot inserter, configured to insert a pilot into the modulated information sequence, where how pilot insertion is performed is a prior art, and details are not described herein again;

a synchronization sequence inserter, configured to insert a synchronization sequence into the modulated information sequence, where how synchronization sequence insertion is performed is a prior art, and details are not described herein again;

a power water filler, configured to perform, according to a channel characteristic of a receive end, power water-filling on the modulated information sequence on which pilot insertion and synchronization sequence insertion are performed, so as to achieve an objective of equalizing performance of a same modulation order, where how power water-filling is performed is a prior art, and details are not described herein again; and a CP adder, configured to add a CP to the modulated information sequence processed by IFFT.

According to a process shown in FIG. 4, the modulated information sequence that is input into the IFFT device 13 is a modulated information sequence on which power water-filling is performed; and the modulated information sequence to be processed by the parallel-to-serial converter 14 is a modulated information sequence which IFFT-processed and to which a CP is added.

It should be noted that after performing serial-to-parallel conversion on the bit sequence of the service data, the foregoing serial-to-parallel converter 11 obtains a parallel bit sequence of the service data, which is equivalent to dividing of one data block into multiple (for example, 1024) data sub-blocks.

Each data sub-block needs to be processed by these devices from the mapper 12 to the IFFT device. Afterwards, the CP adder adds a CP to the entire symbol, or separately adds a CP to a real part and an imaginary part (the real part and the imaginary part are introduced subsequently in this specification).

Furthermore, in practice, a working principle of the IQMZ is to perform modulation on an input I signal and Q signal to obtain optical signals. A modulated information sequence after IFFT is performed is actually a complex number including a real part and an imaginary part. There may be two parallel-to-serial converters 14 and two digital-to-analog converters 15, which separately perform parallel-to-serial conversion and digital-to-analog conversion on the real part and the imaginary part. Signals output by the two digital-to-analog converters are an I signal and a Q signal. Only one CP adder may be required, that is, a CP is added to the entire symbol; or two CP adders may be required to separately add a CP to the real part and the imaginary part.

Figure 5:
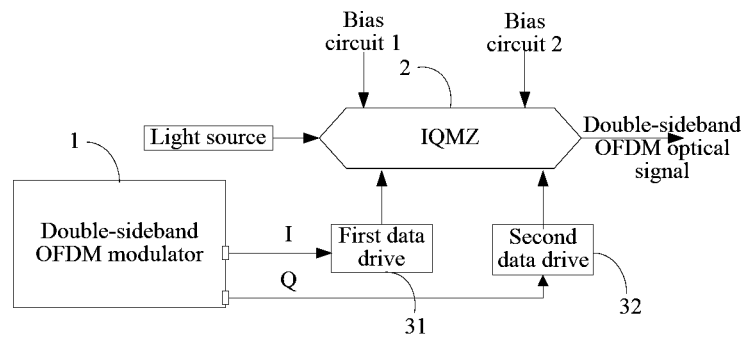
FIG. 5 is another structural diagram of a sending apparatus according to an embodiment of the present invention.

Referring to FIG. 5, in another embodiment of the present invention, the optical signal sending apparatus in all the foregoing embodiments may further include a first data drive 31 and a second data drive 32, which are configured to separately perform gain amplification on the I signal and the Q signal. How gain amplification is performed is a prior art, and details are not described herein again.

Furthermore, still referring to FIG. 5, the optical signal sending apparatus further includes a bias circuit 1 and a bias circuit 2, which are configured to: provide the IQMZ with a direct current bias voltage, and make a modulation point biased to a proper location of a modulation curve, so as to obtain a proper optical carrier and a proper double-sideband OFDM optical signal. An existing circuit may be used as a bias circuit, and details are not described herein again. A signal input to the IQMZ in this embodiment of the present invention is a double-sideband OFDM signal; therefore, the adjustment of an IQMZ bias point is not limited to a single sideband, so that an adjustment range is expanded, and the IQMZ modulator may be biased at a point at which OFDM transmission system performance is optimal.

The devices in the foregoing double-sideband OFDM modulator may be hardware devices, or logical function modules.

When they are logical function modules, the double-sideband OFDM modulator may be a digital signal processor (DSP) chip, a CPU, a field programmable gate array (FPGA), or the like.

Figure 6:
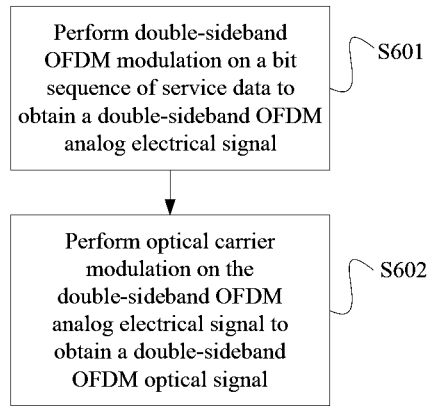
FIG. 6 is a flowchart of a sending method according to an embodiment of the present invention.

Correspondingly, an embodiment of the present invention further claims the protection of a sending method. Referring to FIG. 6, the sending method may include at least the following steps:

S601. Perform double-sideband OFDM modulation on a bit sequence of service data to obtain a double-sideband OFDM analog electrical signal, where:

the double-sideband OFDM analog electrical signal carries the service data on both positive and negative sidebands.

S602. Perform optical carrier modulation on the double-sideband OFDM analog electrical signal to obtain a double-sideband OFDM optical signal, where: the double-sideband OFDM optical signal carries the service data on both positive and negative sidebands.

In another embodiment of the present invention, "the performing double-sideband OFDM modulation" in all the foregoing embodiments may include:

performing serial-to-parallel conversion on the bit sequence of the service data;

performing, according to a modulation scheme used by each subcarrier, m quadrature amplitude modulation mapping on the bit sequence of the service data, where serial-to-parallel conversion has been performed on the bit sequence; and successively filling the mapped service data in the second to the $2N^{th}$ subcarriers to obtain a modulated information sequence;

performing IFFT on the modulated information sequence;

performing parallel-to-serial conversion on the modulated information sequence processed by IFFT, to obtain a double-sideband OFDM digital electrical signal; and performing digital-to-analog conversion on the double-sideband OFDM digital electrical signal to obtain the double-sideband OFDM analog electrical signal.

For related content, refer to the foregoing description in this specification. Details are not described herein again.

After a sending party is introduced, a receiving party is introduced in the following.

Figure 7:
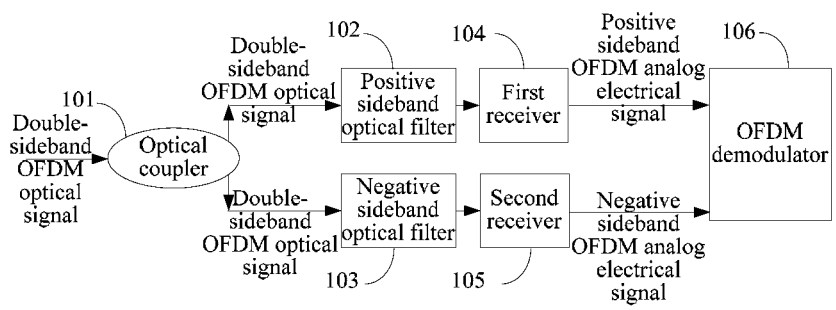
FIG. 7 is a schematic structural diagram of a receiving apparatus according to an embodiment of the present invention.

FIG. 7 shows a structure of a receiving apparatus, and the receiving apparatus may include at least:

an optical coupler 101, a positive sideband optical filter 102, a negative sideband optical filter 103, a first receiver 104, a second receiver 105, and an OFDM demodulator 106.

The optical coupler 101 is separately connected to the positive sideband optical filter 102 and the negative sideband optical filter 103, the positive sideband optical filter 102 is further connected to the first receiver 104, the negative sideband optical filter 103 is further connected to the second receiver 105, the first receiver 104 is further connected to the OFDM demodulator 106, and the second receiver 105 is further connected to the OFDM demodulator 106.

More specifically, an output end of the positive sideband optical filter 102 is connected to an input end of the first receiver 104, an output end of the negative sideband optical filter 103 is connected to an input end of the second receiver 105, an output end of the first receiver 104 is connected to a first input end of the OFDM demodulator 106, and an output end of the second receiver 105 is connected to a second input end of the OFDM demodulator 106;

where:

the optical coupler 101 is configured to: divide a received double-sideband OFDM optical signal into two signals, and respectively output the two signals to the positive sideband optical filter 102 and the negative sideband optical filter 103, where:

the double-sideband OFDM optical signal carries service data on both positive and negative sidebands.

An existing optical coupler may be chosen as an optical coupler, and details are not described herein again.

The positive sideband optical filter 102 is configured to filter out a positive sideband OFDM optical signal from the received double-sideband OFDM optical signal.

The negative sideband optical filter 103 is configured to filter out a negative sideband OFDM optical signal from the received double-sideband OFDM optical signal.

A center frequency and bandwidth of the positive sideband optical filter 102 match a center frequency and bandwidth of a positive sideband. A center frequency and bandwidth of the negative sideband optical filter 103 match a center frequency and bandwidth of a negative sideband. A positive sideband optical filter is used as an example. An optical carrier frequency is 192.1 THz, the center frequency of the positive sideband is 192.1125 THz, and the bandwidth is 25 GHz. The center frequency of the positive sideband optical filter may also be 192.1125 THz, and the bandwidth of the positive sideband optical filter may be 25 GHz.

The first receiver 104 is configured to: perform optical-to-electrical conversion, that is, convert the positive sideband OFDM optical signal into a positive sideband OFDM analog electrical signal, and output the positive sideband OFDM analog electrical signal to the OFDM demodulator 106.

The second receiver 105 is configured to: perform optical-to-electrical conversion, that is, convert the negative sideband OFDM optical signal into a negative sideband OFDM analog electrical signal, and output the negative sideband OFDM analog electrical signal to the OFDM demodulator 106.

The first receiver and the second receiver may be specifically PIN photodiodes.

The OFDM demodulator 106 is configured to perform OFDM demodulation on the positive sideband OFDM analog electrical signal and the negative sideband OFDM analog electrical signal.

More specifically, the positive sideband OFDM analog electrical signal and the negative sideband analog OFDM electrical signal may be combined into one signal for OFDM demodulation; or OFDM demodulation is separately performed on the positive sideband OFDM analog electrical signal and the negative sideband OFDM analog electrical signal.

Figure 8:
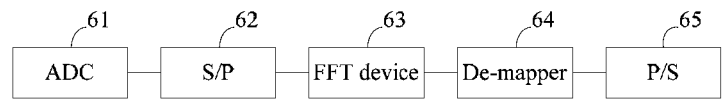
FIG. 8 is a schematic structural diagram of an OFDM demodulator according to an embodiment of the present invention.

Referring to FIG. 8, in another embodiment of the present invention, the OFDM demodulator 106 in all the foregoing embodiments may include: an analog-to-digital converter 61, a serial-to-parallel converter 62, an FFT device 63, a de-mapper 64, and a parallel-to-serial converter 65.

The analog-to-digital converter (ADC) 61 is configured to: perform analog-to-digital conversion on the positive sideband OFDM analog electrical signal to obtain a positive sideband OFDM digital signal, and perform analog-to-digital conversion on the negative sideband OFDM analog electrical signal to obtain a negative sideband OFDM digital signal.

There may be two ADC 61, configured to separately perform analog-to-digital conversion on the positive sideband OFDM analog electrical signal and the negative sideband OFDM analog electrical signal.

How analog-to-digital conversion is performed is a prior art, and details are not described herein again.

The serial-to-parallel converter (S/P) 62 is configured to combine the positive sideband OFDM digital signal and the negative sideband OFDM digital signal into one signal for serial-to-parallel conversion, so as to obtain a double-sideband modulated information sequence; or configured to: separately perform serial-to-parallel conversion on the positive sideband OFDM digital signal and the negative sideband OFDM digital signal to obtain a positive sideband modulated information sequence and a negative sideband modulated information sequence.

There may be two serial-to-parallel converters (S/P) 62, where one serial-to-parallel converter performs serial-to-parallel conversion on the positive sideband OFDM digital signal, and the other serial-to-parallel converter performs serial-to-parallel conversion on the negative sideband OFDM digital signal; or the serial-to-parallel converter (S/P) 62 may include a first serial-to-parallel converter and a second serial-to-parallel converter, where the first serial-to-parallel converter is configured to perform serial-to-parallel conversion on the positive sideband OFDM digital signal, and the second serial-to-parallel converter is configured to perform serial-to-parallel conversion on the negative sideband OFDM digital signal.

How serial-to-parallel conversion is performed is a prior art, and details are not described herein again.

The FFT device 63 is configured to perform FFT on the double-sideband modulated information sequence to obtain a frequency domain double-sideband modulated information sequence; or configured to separately perform FFT on the positive sideband modulated information sequence and the negative sideband modulated information sequence to obtain a frequency domain positive sideband modulated information sequence and a frequency domain negative sideband modulated information sequence.

Similarly, there may be two FFT devices 63, where one FFT device is configured to perform FFT on the positive sideband modulated information sequence to obtain the frequency domain positive sideband modulated information sequence, and the other FFT device is configured to perform FFT on the negative sideband modulated information sequence to obtain the frequency domain negative sideband modulated information sequence; or the FFT device 63 may include a first FFT device and a second FFT device, where the first FFT device is configured to perform FFT on the positive sideband modulated information sequence to obtain the frequency domain positive sideband modulated information sequence, and the second FFT device is configured to perform FFT on the negative sideband modulated information sequence to obtain the frequency domain negative sideband modulated information sequence.

After FFT is performed on a signal, the signal may be transformed from a time domain signal into a frequency domain signal; and how FFT is performed is a prior art, and details are not described herein again.

It should be noted that service data in the frequency domain double-sideband modulated information sequence is distributed on the second to the $2N^{th}$ subcarriers, service data in the frequency domain positive sideband modulated information sequence is distributed on the second to the $N^{th}$ subcarriers, and service data in the frequency domain negative sideband modulated information sequence is distributed on the $(N+1)^{th}$ to the $2N^{th}$ subcarriers.

Figure 9:
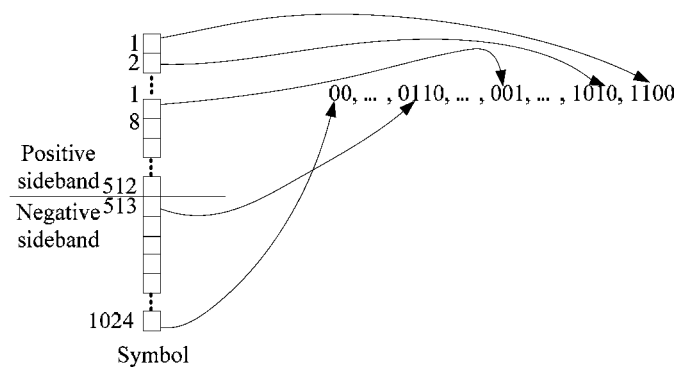
FIG. 9 is a schematic working diagram of a de-mapper according to an embodiment of the present invention.

The de-mapper 64 is configured to: perform m quadrature amplitude modulation de-mapping on the frequency domain double-sideband modulated information sequence, and successively output a de-mapped bit sequence, of the service data, that is distributed on the second to the $2N^{th}$ subcarriers, where this manner may be applicable to a situation in which the second to the $2N^{th}$ subcarriers carry same service data (refer to FIG. 9); or configured to:

perform m quadrature amplitude modulation de-mapping on the frequency domain positive sideband modulated information sequence, and successively output a de-mapped bit sequence (may be referred to as a first bit sequence), of the service data, that is distributed on the second to the $N^{th}$ subcarriers; and perform m quadrature amplitude modulation de-mapping on the frequency domain negative sideband modulated information sequence, and successively output a de-mapped bit sequence (may be referred to as a second bit sequence), of the service data, that is distributed on the $(N+1)^{th}$ to the $2N^{th}$ subcarriers, where a first and a second are only used for distinction.

There may be two de-mappers 64, where one de-mapper performs m quadrature amplitude modulation de-mapping on the frequency domain positive sideband modulated information sequence to output the de-mapped first bit sequence, and the other de-mapper performs m quadrature amplitude modulation de-mapping on the frequency domain negative sideband modulated information sequence to output the de-mapped second bit sequence; or the de-mapper 64 may include a first de-mapper and a second de-mapper, where the first de-mapper is configured to perform m quadrature amplitude modulation de-mapping on the frequency domain positive sideband modulated information sequence to output the de-mapped first bit sequence, and the second de-mapper is configured to perform m quadrature amplitude modulation de-mapping on the frequency domain negative sideband modulated information sequence to output the de-mapped second bit sequence.

Figure 10:
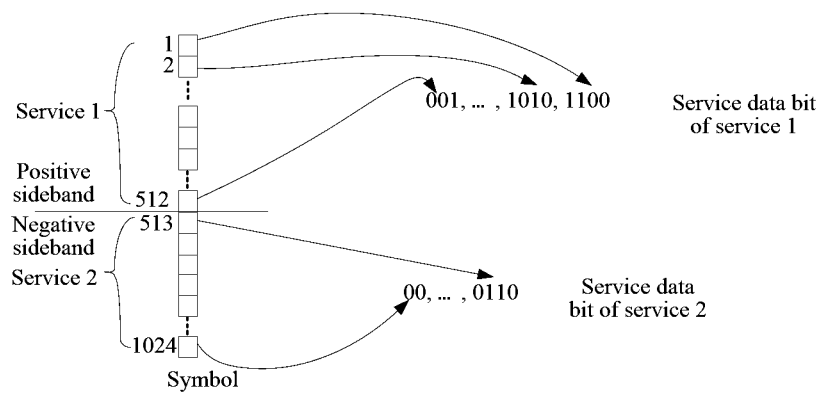
FIG. 10 is another schematic working diagram of a de-mapper according to an embodiment of the present invention.

This manner may be applicable to a situation in which the second to the $N^{th}$ subcarriers bear data of service 1, and the $(N+1)^{th}$ to the $2N^{th}$ subcarriers bear data of service 2 (refer to FIG. 10).

The parallel-to-serial converter 65 is configured to: perform parallel-to-serial conversion on a service data bit output by the de-mapper, or separately perform parallel-to-serial conversion on the first bit sequence and the second bit sequence.

Figure 11:
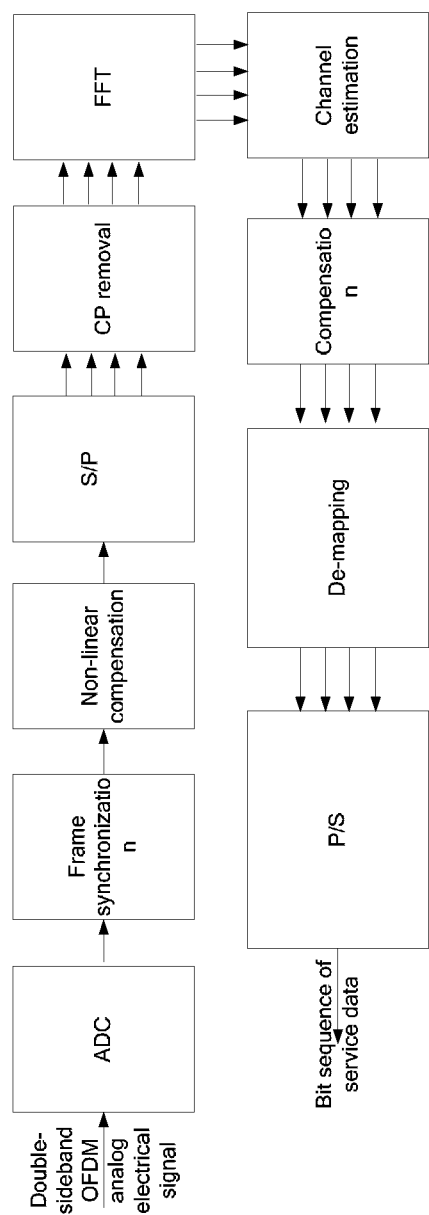
FIG. 11 is a flowchart of OFDM demodulation according to an embodiment of the present invention.

FIG. 11 shows a more detailed step performed by the OFDM demodulator 106. The more detailed step may further include frame synchronization, system non-linear compensation (NLE), CP removal, a channel estimation (in one aspect, the channel estimation is fed back to a transmit end to perform power water-filling, and in the other aspect, the channel estimation is provided to a next step for performing subcarrier crosstalk compensation and phase noise compensation), and compensation (subcarrier crosstalk compensation and phase noise compensation).

From the perspective of device structure, the OFDM demodulator 106 may further include:

a frame synchronizer, configured to separately perform frame synchronization on the positive sideband OFDM digital electrical signal and the negative sideband OFDM digital electrical signal, where how frame synchronization is performed is a prior art, and details are not described herein again; and there may be one or two frame synchronizers, where one frame synchronizer performs frame synchronization on the positive sideband OFDM digital electrical signal, and the other frame synchronizer performs frame synchronization on the negative sideband OFDM digital electrical signal;

a non-linear compensator, configured to perform non-linear compensation on the positive sideband OFDM digital electrical signal and the negative sideband OFDM digital electrical signal on which frame synchronization is performed, where how non-linear compensation is performed is a prior art, and details are not described herein again; and similarly, there may be one or two non-linear compensators;

a CP remover, configured to perform CP removal on the positive sideband OFDM digital electrical signal and the negative sideband OFDM digital electrical signal on which non-linear compensation is performed, where how CP removal is performed is a prior art, and details are not described herein again; and similarly, there may be one or two CP removers;

a channel estimator, configured to perform a channel estimation, where how a channel estimation is performed is a prior art, and details are not described herein again; and a compensator, configured to perform subcarrier crosstalk compensation and phase noise compensation, where how subcarrier crosstalk compensation and phase noise compensation are performed is a prior art, and details are not described herein again; and similarly, there may be one or two compensators.

Furthermore, according to the process shown in FIG. 11, a digital signal that is input to the serial-to-parallel 62 is a signal on which NLE is performed, a modulated information sequence (a digital signal) that is input to the FFT device 63 is a sequence on which CP removal is performed, and a modulated information sequence that is input to the de-mapper 64 is a sequence on which compensation is performed.

The devices in the foregoing OFDM demodulator 106 may be hardware devices, or logical function modules.

When they are logical function modules, the OFDM demodulator 106 may be a DSP chip, a CPU, an FPGA, or the like.

Correspondingly, an embodiment of the present invention further claims the protection of a front-end circuit. Still refer to FIG. 7. The front-end circuit may include an optical coupler 101, a positive sideband optical filter 102, a negative sideband optical filter 103, a first receiver 104, and a second receiver 105. For related content, refer to the foregoing description in this specification. Details are not described herein again. Furthermore, the optical coupler 101, the positive sideband optical filter 102, the negative sideband optical filter 103, the first receiver 104 and the second receiver 105 may be integrated, for example, integrated into a chip, or integrated on a circuit board.

It should be noted that, when optical communication is performed, it may be required to both send an optical signal and receive an optical signal; therefore, an embodiment of the present invention further claims the protection of a transceiving system, where the transceiving system may include the foregoing sending apparatus and receiving apparatus.

As introduced previously, the double-sideband OFDM modulator in the optical signal sending apparatus may be a DSP chip, a CPU, or an FPGA, and the OFDM demodulator in the optical signal receiving apparatus may be a DSP chip, a CPU, or an FPGA. In an optical signal transmission system, one DSP chip, one CPU, or one FPGA may be used to implement functions of the double-sideband OFDM modulator and the OFDM demodulator; and two DSP chips, two CPUs, or two FPGAs may be used, where one is used to implement a function of the double-sideband OFDM modulator, and the other is used to implement a function of the OFDM demodulator. A person skilled in the art may make a flexible design according to an actual situation, and details are not described herein again.

Figure 12:
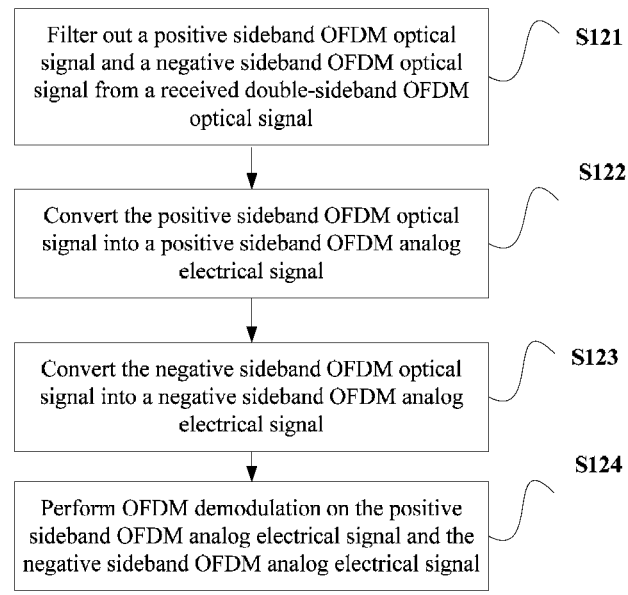
FIG. 12 is a flowchart of a receiving method according to an embodiment of the present invention.

Correspondingly, an embodiment of the present invention further claims the protection of an optical signal receiving method. Referring to FIG. 12, the sending method may include at least the following steps:

S121. Filter out a positive sideband OFDM optical signal and a negative sideband OFDM optical signal from a received double-sideband OFDM optical signal, where: the double-sideband OFDM optical signal carries service data on both positive and negative sidebands.

S122. Convert the positive sideband OFDM optical signal into a positive sideband OFDM analog electrical signal.

S123. Convert the negative sideband OFDM optical signal into a negative sideband OFDM analog electrical signal.

S124. Perform OFDM demodulation on the positive sideband OFDM analog electrical signal and the negative sideband OFDM analog electrical signal.

More specifically, the positive sideband OFDM analog electrical signal and the negative sideband analog OFDM electrical signal may be combined into one signal for OFDM demodulation; or OFDM demodulation may also be separately performed on the positive sideband OFDM analog electrical signal and the negative sideband OFDM analog electrical signal.

In another embodiment of the present invention, "that the positive sideband OFDM analog electrical signal and the negative sideband analog OFDM electrical signal are combined into one signal for OFDM demodulation" in all the foregoing embodiments may include:

separately performing analog-to-digital conversion on the positive sideband OFDM analog electrical signal and the negative sideband OFDM analog electrical signal to obtain a positive sideband OFDM digital signal and a negative sideband OFDM digital signal;

combining the positive sideband OFDM digital signal and the negative sideband OFDM digital signal into one signal, and performing serial-to-parallel conversion on the signal to obtain a double-sideband modulated information sequence;

performing FFT on the foregoing double-sideband modulated information sequence to obtain a frequency domain double-sideband modulated information sequence;

performing m quadrature amplitude modulation de-mapping on the foregoing frequency domain double-sideband modulated information sequence, and successively outputting a de-mapped bit sequence, of service data, that is distributed on the second to the $2N^{th}$ subcarriers; and performing parallel-to-serial conversion on the de-mapped bit sequence of the service data to obtain an (original) bit sequence of the service data.

"That OFDM demodulation is separately performed on the positive sideband OFDM analog electrical signal and the negative sideband OFDM analog electrical signal" in all the foregoing embodiments may include:

separately performing analog-to-digital conversion on the positive sideband OFDM analog electrical signal and the negative sideband OFDM analog electrical signal to obtain a positive sideband OFDM digital signal and a negative sideband OFDM digital signal;

separately performing serial-to-parallel conversion on the positive sideband OFDM digital signal and the negative sideband OFDM digital signal to obtain a positive sideband modulated information sequence and a negative sideband modulated information sequence;

separately performing Fourier transform on the positive sideband modulated information sequence and the negative sideband modulated information sequence to obtain a frequency domain positive sideband modulated information sequence and a frequency domain negative sideband modulated information sequence;

performing m quadrature amplitude modulation de-mapping on the foregoing frequency domain positive sideband modulated information sequence, successively outputting a de-mapped first bit sequence that is distributed on the second to the $N^{th}$ subcarriers, and performing parallel-to-serial conversion on the de-mapped first bit sequence; and performing m quadrature amplitude modulation de-mapping on the foregoing frequency domain negative sideband modulated information sequence, successively outputting a de-mapped second bit sequence that is distributed on the $(N+1)^{th}$ to the $2N^{th}$ subcarriers, and performing parallel-to-serial conversion on the de-mapped second bit sequence.

For related content, refer to the foregoing description in this specification. Details are not described herein again.

In combination with the embodiments disclosed in this specification, method or algorithm steps may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

The embodiments disclosed above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention is not intended to be limited to these embodiments illustrated in this specification, but shall be construed in the widest scope consistent with the principles and novel features disclosed in this specification.

What is claimed is:

1. A sending apparatus, comprising:
   a double-sideband orthogonal frequency division multiplexing (OFDM) modulator, configured to perform double-sideband OFDM modulation on a bit sequence of service data to obtain a double-sideband OFDM analog electrical signal, wherein the double-sideband OFDM analog electrical signal carries the service data on both positive and negative sidebands, the positive sideband comprises a plurality of subcarriers including a first subcarrier through an $N^{th}$ subcarrier, the negative sideband comprises a plurality of subcarriers including an $(N+1)^{th}$ subcarrier through a $2N^{th}$ subcarrier, and N is an integer greater than 1; and
   an in-phase quadrature phase-shift keying Mach Zehnder (IQMZ) modulator, configured to perform optical carrier modulation on the double-sideband OFDM analog electrical signal to obtain a double-sideband OFDM optical signal, wherein the double-sideband OFDM optical signal carries the service data on both positive and negative sidebands.

2. The apparatus according to claim 1, wherein the double-sideband OFDM modulator comprises:
   a serial-to-parallel converter, configured to perform serial-to-parallel conversion on the bit sequence of the service data;
   a mapper, configured to: perform, according to a modulation scheme used by each subcarrier, m quadrature amplitude modulation mapping on the bit sequence of the service data after the serial-to-parallel converter has performed serial-to-parallel conversion on the bit sequence; and successively fill the mapped bit sequence of the service data in a plurality of subcarriers including a second subcarrier through the $2N^{th}$ subcarrier to obtain a modulated information sequence;
   an inverse fast Fourier transform (IFFT) device, configured to perform IFFT on the modulated information sequence;
   a parallel-to-serial converter, configured to perform parallel-to-serial conversion on the modulated information sequence processed by the IFFT device to obtain a double-sideband OFDM digital electrical signal; and
   a digital-to-analog converter, configured to perform digital-to-analog conversion on the double-sideband OFDM digital electrical signal to obtain the double-sideband OFDM analog electrical signal.

3. A receiving apparatus, comprising:
   an optical coupler, a positive sideband optical filter, a negative sideband optical filter, a first receiver, a second receiver, and an orthogonal frequency division multiplexing (OFDM) demodulator, wherein:
   the optical coupler is separately connected to the positive sideband optical filter and the negative sideband optical filter;
   the positive sideband optical filter is further connected to the first receiver;
   the negative sideband optical filter is further connected to the second receiver;
   the first receiver is further connected to the OFDM demodulator; and
   the second receiver is further connected to the OFDM demodulator;
   wherein:
   the optical coupler is configured to: divide a received double-sideband OFDM optical signal into two signals, and respectively output the two signals to the positive sideband optical filter and the negative sideband optical filter, wherein the received double-sideband OFDM optical signal carries service data on both positive and negative sidebands, the positive sideband comprises a plurality of subcarriers including a first subcarrier through an $N^{th}$ subcarrier, the negative sideband comprises a $(N+1)^{th}$ subcarrier through a $2N^{th}$ subcarrier, and N is an integer greater than 1;
   the positive sideband optical filter is configured to filter out a positive sideband OFDM optical signal from the received double-sideband OFDM optical signal;
   the negative sideband optical filter is configured to filter out a negative sideband OFDM optical signal from the received double-sideband OFDM optical signal;
   the first receiver is configured to perform optical-to-electrical conversion on the positive sideband OFDM optical signal to obtain a positive sideband OFDM analog electrical signal;
   the second receiver is configured to perform optical-to-electrical conversion on the negative sideband OFDM optical signal to obtain a negative sideband OFDM analog electrical signal; and
   the OFDM demodulator is configured to perform OFDM demodulation on the positive sideband OFDM analog electrical signal and the negative sideband OFDM analog electrical signal.

4. The apparatus according to claim 3, wherein the OFDM demodulator comprises:
   an analog-to-digital converter, configured to: perform analog-to-digital conversion on the positive sideband OFDM analog electrical signal to obtain a positive sideband OFDM digital signal, and perform analog-to-digital conversion on the negative sideband OFDM analog electrical signal to obtain a negative sideband OFDM digital signal;

a serial-to-parallel converter, configured to: combine the positive sideband OFDM digital signal and the negative sideband OFDM digital signal into one signal and perform serial-to-parallel conversion on the signal to obtain a double-sideband modulated information sequence;

a fast Fourier transform (FFT) device, configured to perform FFT on the double-sideband modulated information sequence to obtain a frequency domain double-sideband modulated information sequence;

a de-mapper, configured to: perform m quadrature amplitude modulation de-mapping on the frequency domain double-sideband modulated information sequence, and successively output a de-mapped bit sequence of the service data; and a parallel-to-serial converter, configured to: perform parallel-to-serial conversion on the bit sequence, which is output by the de-mapper, of the service data.

5. A sending method, comprising:

performing double-sideband orthogonal frequency division multiplexing (OFDM) modulation on a bit sequence of service data to obtain a double-sideband OFDM analog electrical signal, wherein the double-sideband OFDM analog electrical signal carries the service data on both positive and negative sidebands, the positive sideband comprises a plurality of subcarriers including a first subcarrier through a $N^{th}$ subcarrier, the negative sideband comprises a plurality of subcarriers including a $(N+1)^{th}$ subcarrier through a $2N^{th}$ subcarrier, and N is an integer greater than 1; and performing optical carrier modulation on the double-sideband OFDM analog electrical signal to obtain a double-sideband OFDM optical signal, wherein the double-sideband OFDM optical signal carries the service data on both positive and negative sidebands.

6. The method according to claim 5, wherein performing double-sideband OFDM modulation comprises:

performing serial-to-parallel conversion on the bit sequence of the service data;

performing, according to a modulation scheme used by each subcarrier, m quadrature amplitude modulation mapping on the bit sequence of the service data after serial-to-parallel conversion has been performed on the bit sequence; and successively filling the mapped service data in a plurality of subcarriers including a second subcarrier through the $2N^{th}$ subcarrier to obtain a modulated information sequence;

performing inverse fast Fourier transform (IFFT) on the modulated information sequence;

performing parallel-to-serial conversion on the modulated information sequence processed by IFFT to obtain a double-sideband OFDM digital electrical signal; and performing digital-to-analog conversion on the double-sideband OFDM digital electrical signal to obtain the double-sideband OFDM analog electrical signal.

7. A receiving method, comprising:

filtering out a positive sideband orthogonal frequency division multiplexing (OFDM) optical signal and a negative sideband OFDM optical signal from a received double-sideband OFDM optical signal, wherein the double-sideband OFDM optical signal carries service data on both positive and negative sidebands, the positive sideband comprises a plurality of subcarriers including a first through a $N^{th}$ subcarrier, the negative sideband comprises a plurality of subcarriers including a $(N+1)^{th}$ subcarrier through a $2N^{th}$ subcarrier, and N is an integer greater than 1;

performing optical-to-electrical conversion on the positive sideband OFDM optical signal to obtain a positive sideband OFDM analog electrical signal;

performing optical-to-electrical conversion on the negative sideband OFDM optical signal to obtain a negative sideband OFDM analog electrical signal; and performing OFDM demodulation on the positive sideband OFDM analog electrical signal and the negative sideband OFDM analog electrical signal.

8. The method according to claim 7, wherein performing demodulation on the positive sideband OFDM analog electrical signal and the negative sideband OFDM analog electrical signal comprises:

combining the positive sideband OFDM analog electrical signal and the negative sideband OFDM analog electrical signal into one signal and performing OFDM demodulation on the signal.

9. The method according to claim 8, wherein combining the positive sideband OFDM analog electrical signal and the negative sideband analog OFDM electrical signal into one signal and performing OFDM demodulation on the signal comprises:

separately performing analog-to-digital conversion on the positive sideband OFDM analog electrical signal and the negative sideband OFDM analog electrical signal to obtain a positive sideband OFDM digital signal and a negative sideband OFDM digital signal;

combining the positive sideband OFDM digital signal and the negative sideband OFDM digital signal into the one signal, and performing serial-to-parallel conversion on the one signal to obtain a double-sideband modulated information sequence;

performing fast Fourier transform (FFT) on the double-sideband modulated information sequence to obtain a frequency domain double-sideband modulated information sequence;

performing m quadrature amplitude modulation de-mapping on the frequency domain double-sideband modulated information sequence, and successively outputting a de-mapped bit sequence of the service data; and performing parallel-to-serial conversion on the de-mapped bit sequence of the service data.

10. The method according to claim 7, wherein performing demodulation on the positive sideband OFDM analog electrical signal and the negative sideband OFDM analog electrical signal comprises:

separately performing OFDM demodulation on the positive sideband OFDM analog electrical signal and the negative sideband OFDM analog electrical signal.

11. The apparatus according to claim 3, wherein the OFDM demodulator comprises:

an analog-to-digital converter, configured to: perform analog-to-digital conversion on the negative sideband OFDM analog electrical signal to obtain a negative sideband OFDM digital signal;

a serial-to-parallel converter, configured to: separately perform serial-to-parallel conversion on the positive sideband OFDM digital signal and the negative sideband OFDM digital signal to obtain a positive sideband modulated information sequence and a negative sideband modulated information sequence;

a fast Fourier transform (FFT) device, configured to separately perform FFT on the positive sideband modulated information sequence and the negative sideband modulated information sequence to obtain a frequency domain positive sideband modulated information sequence and a frequency domain negative sideband modulated information sequence;

a de-mapper, configured to: perform m quadrature amplitude modulation de-mapping on the frequency domain positive sideband modulated information sequence, and successively output a de-mapped bit sequence that is distributed on a plurality of subcarriers including a second subcarrier through the $N^{th}$ subcarrier; and perform m quadrature amplitude modulation de-mapping on the frequency domain negative sideband modulated information sequence, and successively output a de-mapped bit sequence that is distributed on the $(N+1)^{th}$ to the $2N^{th}$ subcarriers; and a parallel-to-serial converter, configured to: separately perform parallel-to-serial conversion on the de-mapped bit sequence that is distributed on a plurality of subcarriers including a second subcarrier through the $N^{th}$ subcarrier and the de-mapped bit sequence that is distributed on the $(N+1)^{th}$ to the $2N^{th}$ subcarriers.

12. The method according to claim 10, wherein separately performing OFDM demodulation on the positive sideband OFDM analog electrical signal and the negative sideband OFDM analog electrical signal comprises:

separately performing analog-to-digital conversion on the positive sideband OFDM analog electrical signal and the negative sideband OFDM analog electrical signal to obtain a positive sideband OFDM digital signal and a negative sideband OFDM digital signal;

separately performing serial-to-parallel conversion on the positive sideband OFDM digital signal and the negative sideband OFDM digital signal to obtain a positive sideband modulated information sequence and a negative sideband modulated information sequence;

separately performing a fast Fourier transform on the positive sideband modulated information sequence and the negative sideband modulated information sequence to obtain a frequency domain positive sideband modulated information sequence and a frequency domain negative sideband modulated information sequence;

performing m quadrature amplitude modulation de-mapping on the frequency domain positive sideband modulated information sequence, successively outputting a de-mapped bit sequence that is distributed on a plurality of subcarriers including a second subcarrier through the $N^{th}$ subcarrier, and performing parallel-to-serial conversion on the de-mapped bit sequence; and performing m quadrature amplitude modulation de-mapping on the frequency domain negative sideband modulated information sequence, successively outputting a de-mapped bit sequence that is distributed on the $(N+1)^{th}$ to the $2N^{th}$ subcarriers, and performing parallel-to-serial conversion on the de-mapped bit sequence.

* * * * *